Dec. 15, 1959   L. SCHWARZMAYR   2,917,240
COMBUSTION GAS HEATING SYSTEM
Filed Aug. 24, 1956   3 Sheets-Sheet 1
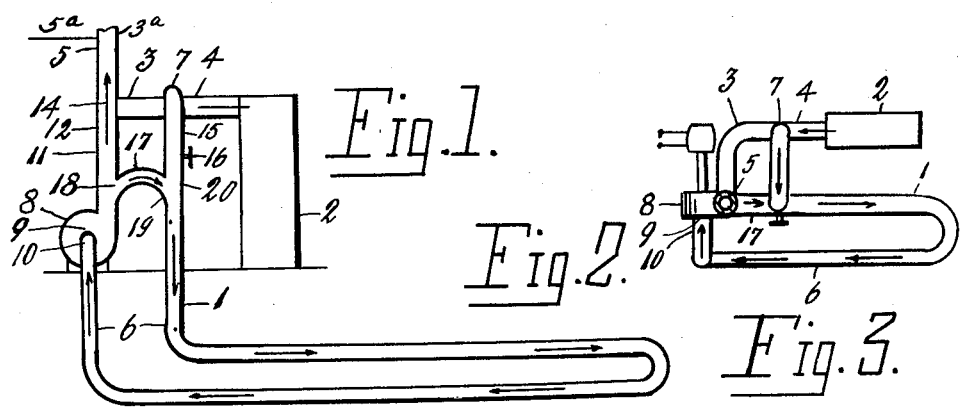
Fig.1.
Fig.2.
Fig.3.
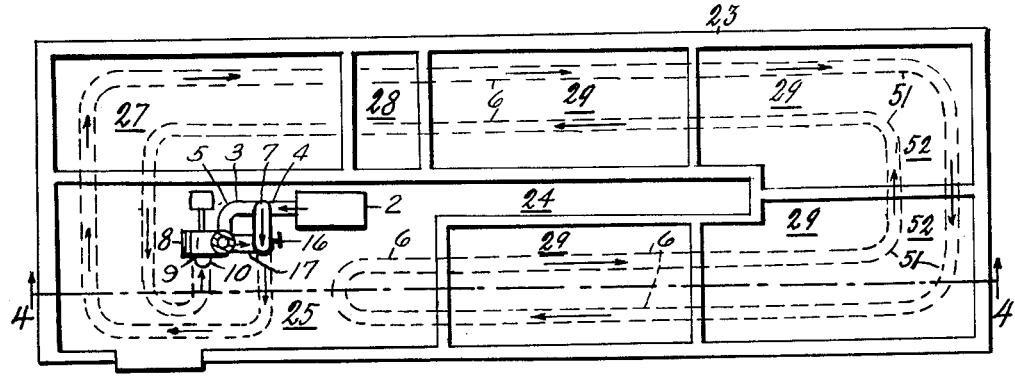
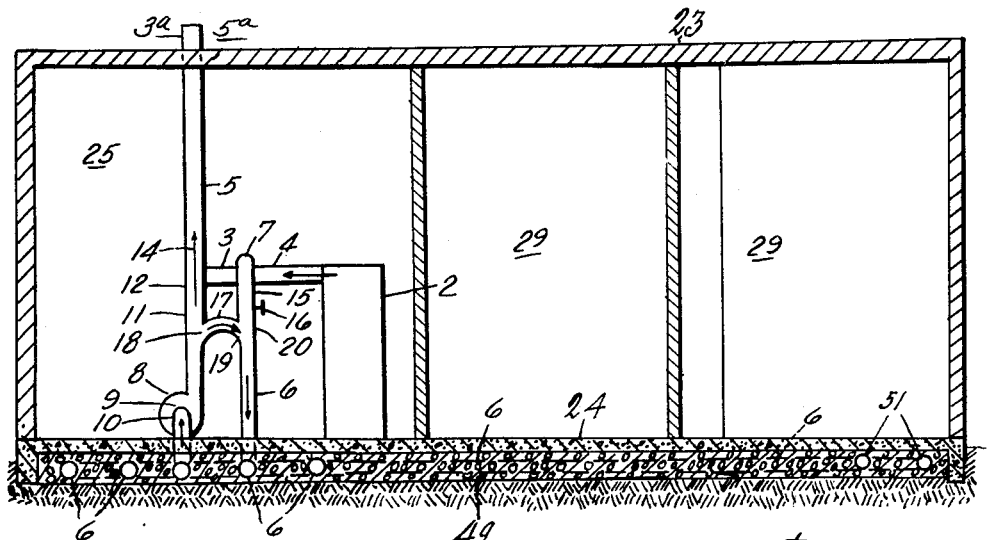
Fig.4.
Inventor:
Ludwig Schwarzmayr

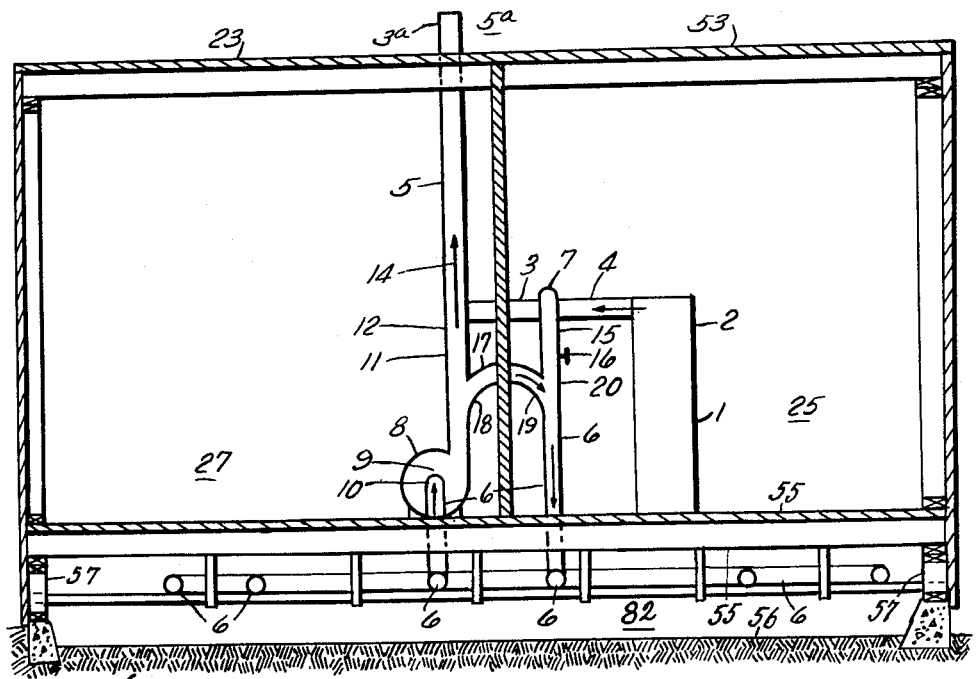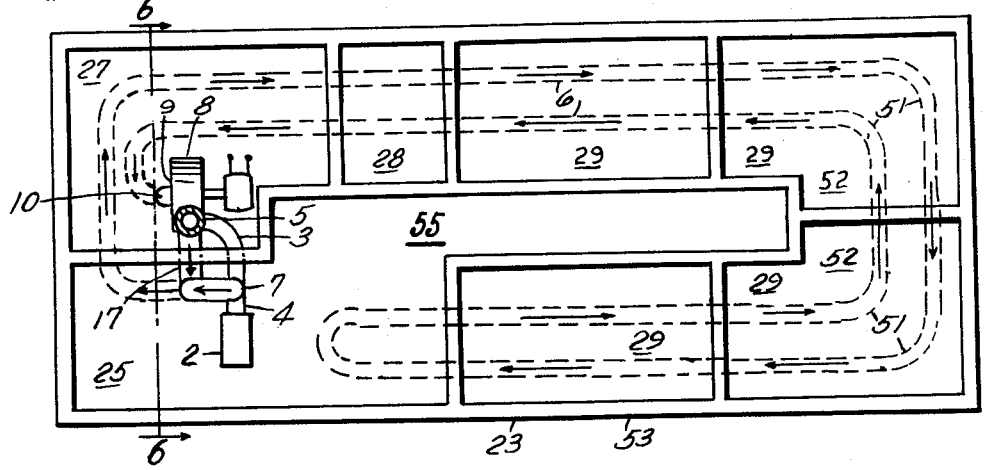

United States Patent Office 2,917,240
Patented Dec. 15, 1959

2,917,240

COMBUSTION GAS HEATING SYSTEM

Ludwig Schwarzmayr, San Francisco, Calif.

Application August 24, 1956, Serial No. 606,150

2 Claims. (Cl. 237—69)

My invention relates to improvements in combustion gas heating systems of the type shown and described in my copending application Serial No. 342,915, filed March 17, 1953, now abandoned.

One object of my invention is the construction of a combustion gas heating system which greatly reduces the cost of heating residential buildings, especially the low cost buildings having concrete floors.

Another object is a combustion gas heating system for frame buildings which prevents breeding of termites in the lower part of the building.

I attain these objects by the construction illustrated in the accompanying drawing in which—

Figure 1 is a schematic illustration of the combustion gas heating system in elevation;

Fig. 2 is a plan view of the combustion gas heating system of Fig. 1;

Fig. 3 is a plan view of a residential building having a concrete floor and provided with the combustion gas heating system of the invention;

Fig. 4 is a section on line 4—4 in Fig. 3;

Fig. 5 is a plan view of a frame building in conjunction with the combustion gas heating system of the invention;

Fig. 6 is a section on line 6—6 in Fig. 5, and

Figure 7:
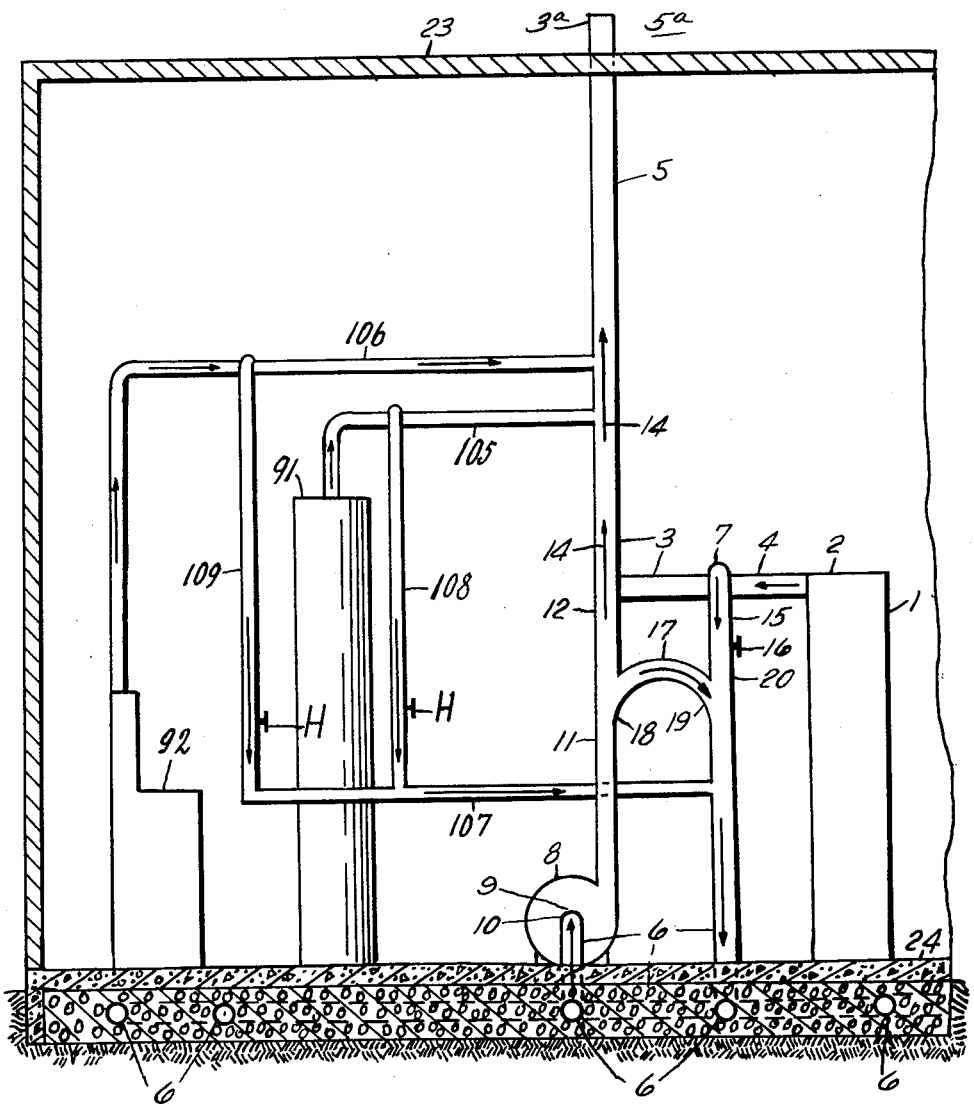
Fig. 7 is a building, shown in part, in vertical section, conventional gas burning household appliances comprising a household oven and a household water heater having discharge flues to discharge combustion gases to the exterior as waste but are connected with the heat radiation tubes to which the combustion gases can be delivered to supply high temperature combustion gases without extra cost.

The Figs. 1 and 2 are schematic illustrations of the combustion gas heating system of the invention. The combustion gas heating system 1 has a gas heater 2, from which extends a flue 3, which has a gas receiving section 4, receiving gas from the gas heater 2, and a gas discharge section 5 extending to the exterior 5a when the gas heating system is mounted in a building. A heat radiation tube 6 is with inlet end 7 connected with the gas receiving section 4 of the flue 3. A suction fan 8 has its gas inlet 9 connected with an outlet end 10 of the heat radiation tube 6. The fan 8 has a fan discharge tube 11 which is with outlet end 12 connected with the gas discharge section 5 of the flue 3, and is disposed in alignment with the gas discharge section 5 of the flue 3 therefore, the flow from the fan discharge tube 11, shown by the arrow 14, prevents movement of cold air from the exterior 5a to the inlet end 7 of the heat radiation tube 6 when there is a great suction produced by the suction fan 8. Therefore, the flow from the fan discharge tube 11 prevents mixing of cold air from the exterior 5a with high temperature gas from the gas heater 2 when the suction fan 8 is caused to effect a great suction in the heat radiation tube 6.

In the inlet end section 15 of the heat radiation tube 6 is a valve 16. A gas return tube 17 has its inlet end 18 connected with the fan discharge tube 11 and its outlet end 19 connected with the heat radiation tube 6 at the gas delivery side 20 of the valve 16. The gas return tube 17 as arranged with the fan discharge tube 11 of the fan 8 and the heat radiation tube forms a closed circuit for high temperature gases circulated by the fan 8. The flue 3 forms an unobstructed passage for gas from the gas heater 2 to the exterior 5a.

Fig. 3 is a plan view of a residential building 23 having a concrete floor 24. See Fig. 3, in the living room 25 there is a gas heater 2, at 27 is the kitchen, at 28 is the bathroom, and at 29—29 are the bedrooms, which are relatively remote from the gas heater 2.

From the gas heater 2 extends the flue 3, which has a gas receiving section 4 receiving gas from the gas heater 2, and a gas discharge section 5 extending to the exterior 5a of the building 23. A heat radiation tube 6 is with inlet end 7 connected with the gas receiving section 4 of the flue 3. The suction fan 8 is with gas inlet 9 connected with the outlet end 10 of the heat radiation tube 6. The fan discharge tube 11 is with outlet end 12 connected with the gas discharge section 5 spaced from the end 3a of the flue 3. The fan 8 has a fan discharge tube 11 which is disposed in alignment with the gas discharge section 5 of the flue 3, therefore, the flow, shown by the arrow 14, from the fan discharge tube 11 to the gas discharge section 5 of the flue 3 prevents movement of cold air from the exterior 5a to the inlet end 7 of the heat radiation tube 6 when the suction fan 8 is caused to effect a great suction in the heat radiation tube 6 to effect a relatively high-speed recirculation of high temperature gas in the heat radiation tube 6 to assure uniform heating throughout the heat radiation tube 6. In the inlet end section 15 of the heat radiation tube 6 is the valve 16. The gas return tube 17 has its inlet end 18 connected with the fan discharge tube 11 and has the outlet end 19 connected with the heat radiation tube 6 at the gas delivery side 20 of the valve 16. The heat radiation tube 6 is disposed beneath a concrete floor 24 in a mass of gravel 48 or any other fill-in material to form a heat reservoir 49 to help maintain uniform heating of the building 23.

To get the best result the valve 16 is operated in the following manner: During the day time when it is desirable to keep the living room 25 comfortably warm, the valve 16 is positioned to limit suction from the gas heater 2 to combustion gas produced by combustion, but before bed time the valve 16 is opened to an extent that the suction fan 8 not only sucks combustion gas from the gas heater 2 but also the high temperature air heated by the flame of the gas heater 2, therefore, the entire heat radiation tube 6 is filled with high temperature gases including the remote parts 51—51 of the heat radiation tube 6 beneath the floor 52—52 of the bedrooms 29.

The flue 3 forms an unobstructed passage from the gas heater 2 to the exterior 5a, therefore, when the suction fan fails to operate, a natural draft by combustion gas from the gas heater to the exterior is formed, therefore, poisoning by gas in the building is prevented, which often occurs by faulty gas heating systems. The open flue connected by the inlet 7 with the heat radiation tube 6 causes a suction throughout the entire flue 3 to the exterior 5a when the suction fan 8 is caused to effect a great suction in the heat radiation tube 6 to effect a high-speed recirculation of high temperature gas in the heat radiation tube 6 to assure uniform heating throughout the entire heat radiation tube including the section 51 which is remote from the gas heater 2, therefore, the suction would cause movement of cold air from the exterior 5a to the inlet end 7 and the heat radiation tube 6 and mix with high temperature gases from the gas heater and, therefore, would reduce the heating potentiality of high temperature gas from the gas heater 2. This problem is solved by the fan discharge tube 11 extending from the suction fan 8 and having outlet end 12 connected with the gas discharge section 5 spaced from the end 3a of the flue 3, and disposably aligned with the gas discharge section 5 of the flue to direct a flow 14 into the discharge section 5 toward the exterior 5a of the building to prevent movement of cold air from the exterior to the inlet end 7 of the heat radiation tube 6.

The Figs. 5 and 6 show a residential building 23 which is a frame building 53, in conjunction with the combustion gas heating system 1 of the invention. The frame building 53 has a wooden floor 55 spaced from the building ground 56 by the frame substructures 57—57. See Fig. 5, in the living room 25 is the gas heater 2, at 27 is the kitchen, at 28 the bathroom, at 29—29 are the bedrooms. From the gas heater 2 extends the flue 3, which has a gas receiving section 4, receiving gas from the gas heater 2, and a gas discharge section 5 extending to the exterior 5a of the building 23. The heat radiation tube 6 is with inlet end 7 connected with the gas receiving section 64 of the flue 3. A suction fan 8 has its gas inlet 9 connected with the outlet end 10 of the heat radiation tube 6. The fan 8 has a fan discharge tube 11 which has its outlet end 12 connected with the gas discharge section 5 spaced from the end 3a of the flue 3, and is disposed in alignment with the gas discharge section 5 of the flue 3, therefore, the flow, illustrated by the arrow 14, prevents movement of cold air from the exterior 5a to the inlet end 7 of the heat radiation tube 6 when the suction fan 8 is caused to effect a great suction to effect a relatively high-speed recirculation of high temperature gas in the heat radiation tube 6. A gas return tube 17 has its inlet end 18 connected with the fan discharge tube 11, and its outlet end 19 connected with the heat radiation tube 6 at the gas delivery side 20 of the valve 16 in the gas receiving section 15 of the heat radiation tube 6.

The heat radiation tube 6 is disposed in the space 82 between the floor 55 and the building ground 56 to keep the wood of the frame work 57 and the lower part of the building free of moisture to prevent breeding of termites and prevents destruction of building wood by fungi as all the wood is kept dry.

The valve 16 of the combustion gas heating system 1 is operated in the following manner: During the day time when it is desirable to keep the living room 25 comfortably warm, the valve 16 is positioned to limit suction of gas from the gas heater 2 to combution gas produced in the gas heater by combustion, but, before bed time the valve 16 is opened to an extent to cause suction of all high temperature gas and air heated by the flame in the gas heater to the heat radiation tube 6 to fill the entire heat radiation tube with high temperature gas so that the remote sections 51—51 of the heat radiation tube 6 at the floor sections 52—52 in the bedorooms 29 are well heated because these rooms are remote from the gas heater 2 and therefore receive little direct heat from the gas heater 2.

Fig. 7 is a building 23 having a concrete floor 24, is shown in part only, in conjunction with the combustion gas heating system 1 of the invention, comprising a gas heater 2. From the gas heater 2 extends the flue 3 which has a gas receiving section 4, receiving gas from the gas heater 2, and a gas discharge section 5 extending to the exterior 5a of the building 23. A heat radiation tube 6 has its inlet end 7 connected with the gas receiving section 4 of the flue 3. In the inlet section 15 of the heat radiation tube 6 is the valve 16. The outlet end 10 of the heat radiation tube 6 is connected with the gas inlet 9 of the suction fan 8. The fan 8 has a fan discharge tube 11 which with outlet end 12 is connected with the gas discharge section 5 spaced from the end 3a of the flue, and is disposed in alignment with the gas discharge section 5 of the flue, therefore, the flow, shown by the arrows 14—14 from the fan discharge tube 11 to the exterior 5a prevents movement of cold air from the exterior 5a to the inlet end 7 of the heat radiation tube 6. A gas return tube 17 has its inlet end 18 connected with the fan discharge tube 11 and its outlet end 19 connected with the heat radiation tube 6 at the gas delivery side 20 of the valve 16. In the building 23 are the conventional gas burning household appliances 91 and 92 comprising the household water heater 91, and the household oven 92, which are connected by the flues 105 and 106 with the gas discharge section 5 of the flue 3 through which the combustion gas is discharged to the exterior 5a as waste A gas tributary tube 107 extends from the heat radiation tube 6 and has a tributary branch tube 108 connected with the water heater flue 105, and a tributary branch tube 109 is connected with the oven flue 106. Each of the tributary branch tubes 108 and 109 is provided with a valve H—H. Therefore, the system is adapted to use combustion gases from gas burning household appliances, conventionally discharged as waste to the exterior 5a, to supplement the heat radiating gas in the heat radiation tube 6 at no cost.

The combustion gas heating system can utilize all the combustion gas produced in a household, therefore it is very economical, which is very desirable for people of low income, and may make production of heating gas from coal economically practical where it is not at present.

I claim:

1. In a combustion gas heating system, a building, a gas heater in said building, a flue extending from said gas heater and having a gas receiving section receiving gas from said gas heater and a gas discharge section extending to the exterior of said building, a heat radiation tube having an inlet end connected with said gas receiving end of said flue, a valve in the inlet section of said heat radiation tube, a suction fan having a gas inlet connected with the outlet end of said heat radiation tube, said flue forming an unobstructed passage for combustion gas from said gas heater to the exterior when said suction fan fails to operate, means to prevent movement of cold air from the exterior to the inlet end of said heat radiation tube to prevent mixing of cold air with high temperature gas from said gas heater when said suction fan is caused to effect a great suction in said heat radiation tube to effect a high-speed recirculation of high temperature gas to assure uniform heating throughout the entire heat radiation tube and comprising a fan discharge tube extending from said suction fan and having an outlet end connected with said gas discharge section spaced from the end of said flue and disposed in alignment with said gas discharge section to direct a flow toward the exterior, and a gas return tube having an inlet end connected with said fan discharge tube and its outlet end connected with said heat radiation tube at the delivery side of said valve.

2. In a combustion gas heating system, a frame building having a wooden floor, a substructure supporting said floor spaced from the building ground to form a space therebetween, a gas heater in said building, a flue extending from said gas heater and having a gas receiving section receiving gas from said gas heater and a gas discharge section extending to the exterior of said building, a heat radiation tube having an inlet end connected with said gas receiving section of said flue, a suction fan having a gas inlet connected with the outlet end of said heat radiation tube, said flue forming an unobstructed passage from the gas heater to the exterior for combustion gas when said suction fan fails to operate, means to prevent movement of cold air from the exterior to the inlet end of said heat radiation tube when said suction fan is caused to effect a great suction in the heat radiation tube and comprising a fan discharge tube having an outlet end connected with said gas discharge section spaced from the end of said flue and disposed in alignment with said gas discharge section to direct a flow toward the exterior in said gas discharge section, a valve in the gas receiving end of said heat radiation tube, a gas return tube having its inlet end connected with said fan discharge tube and its outlet end connected with said heat radiation tube at the delivery side of said valve, and said heat radiation tube disposed in said space between said floor and the building ground to keep the lower part of the building free of moisture to prevent breeding of termites and to prevent destruction of building wood by fungi.

References Cited in the file of this patent

UNITED STATES PATENTS

| | | |
|---|---|---|
| 2,212,222 | Austin | Aug. 20, 1940 |
| 2,504,315 | Feuerfile | Apr. 18, 1950 |
| 2,577,441 | Zaniroli | Dec. 4, 1951 |

OTHER REFERENCES

"Radiant Heating," by T. N. Adlam, published 1949, by the Industrial Press, pages 6–9, 103, 111 and 113 relied on.